A. J. AMUEDO.
LOCK FOR MOTOR VEHICLES.
APPLICATION FILED JULY 28, 1920.
1,365,215.
Patented Jan. 11, 1921.
2 SHEETS—SHEET 2.
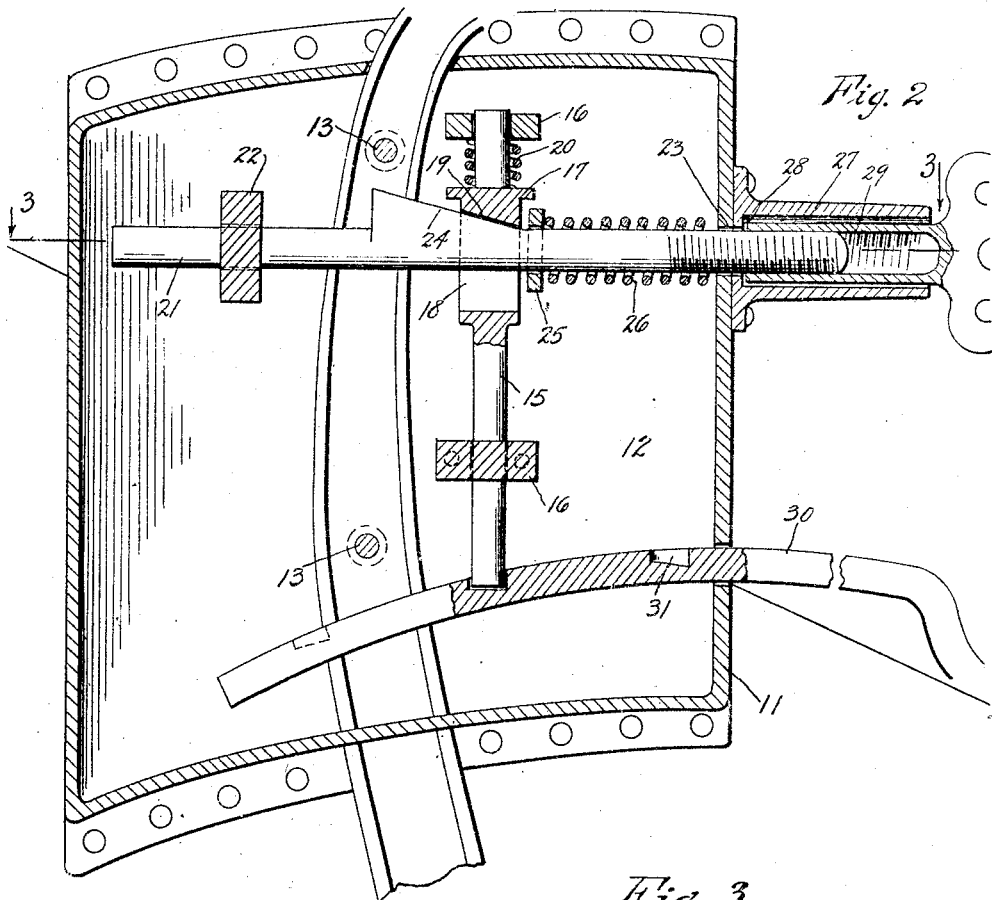
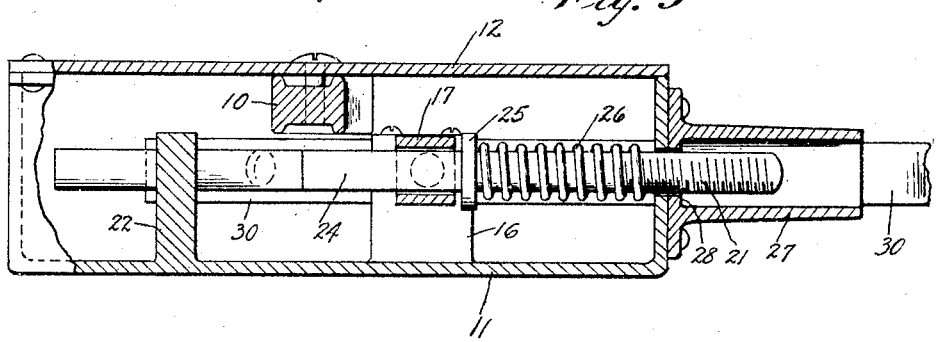
Inventor
A. J. Amuedo
By Lacey & Lacey, Attorney

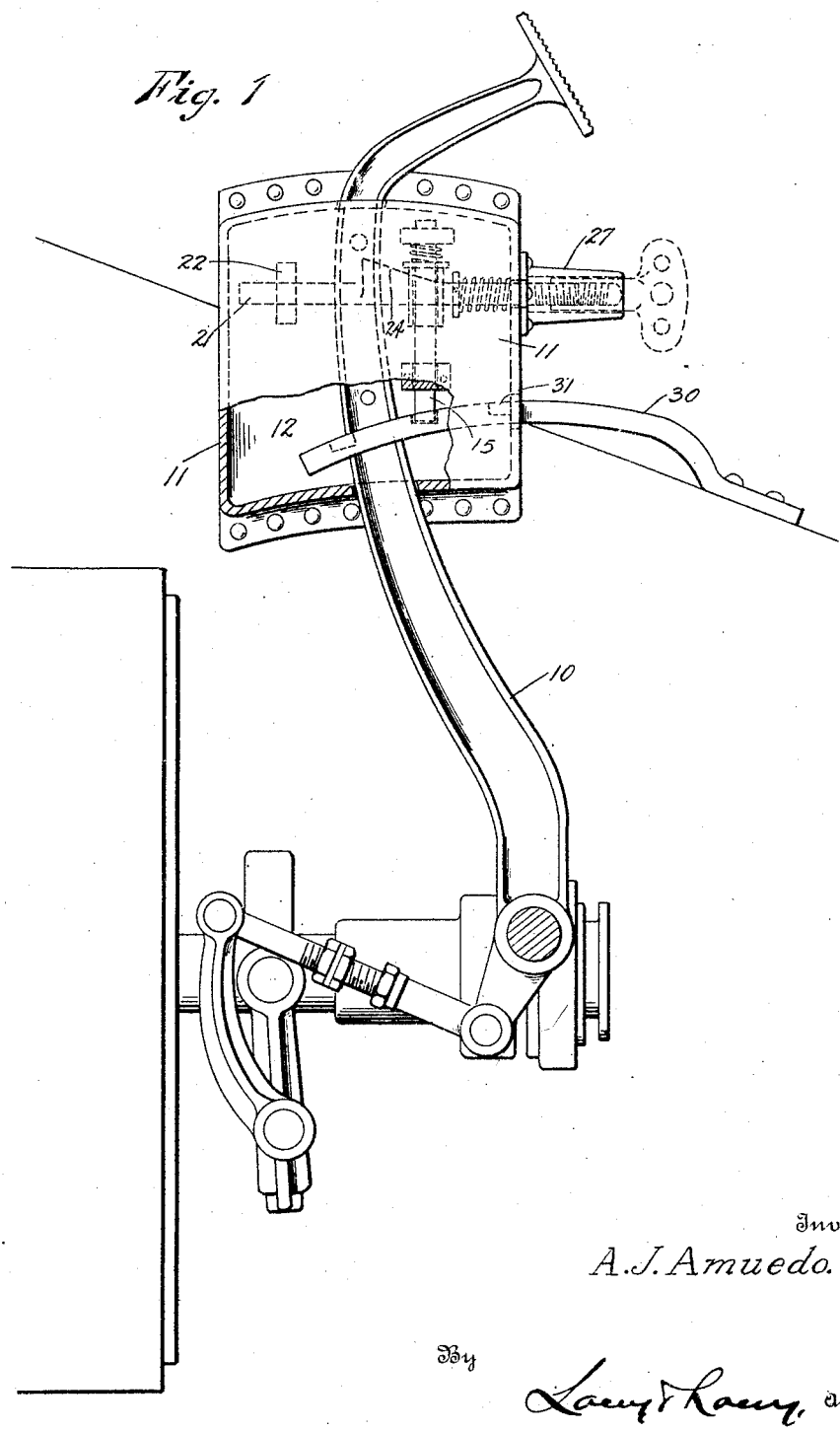

UNITED STATES PATENT OFFICE.

ANTONIO J. AMUEDO, OF NEW ORLEANS, LOUISIANA.

LOCK FOR MOTOR-VEHICLES.

1,365,215.  Specification of Letters Patent.  Patented Jan. 11, 1921.

Application filed July 28, 1920. Serial No. 399,508.

*To all whom it may concern:*

Be it known that I, ANTONIO J. AMUEDO, citizen of the United States, residing at New Orleans, in the parish of Orleans and State of Louisiana, have invented certain new and useful Improvements in Locks for Motor-Vehicles, of which the following is a specification.

This invention relates to an improved lock for motor vehicles and has as one of its principal objects to provide a device of this character whereby one of the operating pedals of a vehicle may be readily secured against movement so as to thereby prevent the unauthorized use of the vehicle.

The invention has as a further object to provide a device of this character employing a fixed quadrant and wherein one of the operating pedals of the vehicle will be equipped with locking mechanism to coact with said quadrant so that, when desired, the pedal may be securely locked against movement.

A still further object of the invention is to provide a lock which cannot easily be tampered with or cannot easily be circumvented and wherein provision will be made to avoid duplication of lock keys.

And the invention has as a still further object to provide a lock which may be readily employed in connection with substantially any conventional design of motor vehicle.

Other and incidental objects will appear hereinafter.

In the drawings:

Figure 1 is a fragmentary side elevation showing my improved device in connection with a motor vehicle operating pedal of conventional design, parts being broken away and shown in section, Fig. 2 is a vertical sectional view on a somewhat enlarged scale, and Fig. 3 is a horizontal section on the line 3—3 of Fig. 2, looking in the direction of the arrows.

In order that the construction, mounting and operation of my improved locking device may be accurately understood I have, in the drawings, shown the device in connection with a motor vehicle operating pedal of conventional design. The pedal is indicated at 10. In the present instance, I have shown the device applied to a clutch pedal. However, as will be better understood as the description proceeds, the device may be employed with equal efficiency upon a brake pedal and I do not, therefore, wish to be limited in this regard.

In carrying the invention into effect, I employ a casing 11 which is preferably pressed from suitable sheet metal and is closed at one side by a cover plate 12. This casing receives the upper end portion of the pedal 10 therethrough and is rigidly secured to the pedal by spaced pins or other suitable fastening devices 13. Slidable vertically within the casing is a bolt 15 carried by spaced guides 16 suitably secured within the casing. This bolt is formed near its upper end with an enlargement or yoke 17 through which is formed a slot 18 having a beveled upper end wall 19. Bearing between the uppermost of the guides 16 and the enlargement 17 is a helical spring 20 surrounding the upper end of the bolt and acting to project the bolt downwardly. Lying at substantially right angles to the bolt is an elevating rod 21 therefor. The inner end portion of this rod is slidably received through a suitable guide 22 secured within the casing 11 while the outer end portion of said rod is freely received through a suitable opening 23 in the rear end wall of the casing. As particularly shown in Fig. 2, the rod is freely received through the slot 18 of the bolt and rising above the rod is an inclined shoulder 24 arranged to coact with the beveled end wall 19 of the enlargement 15 of the bolt. Keyed or otherwise secured upon the rod is a collar 25 and bearing between this collar and the rear end wall of the casing is a helical spring 26 surrounding the rod and normally acting to project the rod forwardly freeing the bolt. Surrounding the opening 23 in the casing to project rearwardly therefrom is a guard sleeve 27 which receives the outer end portion of the rod 21. Said sleeve is riveted or otherwise secured to the rear end wall of the casing and at its inner end is formed with a shoulder 28. As will now be observed, the outer end portion of the rod is threaded and formed to freely fit in the guard sleeve 27 is a tubular key 29 internally threaded to engage the rod. Thus, by rotating the key upon the outer end of the rod until the inner end of the key impinges the shoulder 28, the key may then be further turned for retracting the rod and consequently moving the shoulder 24 against the beveled end wall 19 of the bolt for elevating the bolt. By changing the character and pitch of the threads upon the rod for different locks, ample variation between the keys for different locks may be obtained so that no two locks need be duplicated.

Riveted or otherwise secured at one end to any accessible part of the motor vehicle is a quadrant 30. This quadrant is, of course, curved longitudinally on an arc concentric to the axis of the pedal 10 and the forward end portion thereof is freely received through the rear end wall of the casing 11 to project into the casing beneath the bolt 15. Formed in the quadrant is a series of spaced sockets 31 adapted to selectively receive the lower end of the bolt. Thus, as will now be readily appreciated, when the pedal is released, the key 29 may be removed for freeing the rod 21 and consequently releasing the bolt when the spring 20 will immediately act to depress the bolt to engage at its lower end in one of the sockets 31 of the quadrant. As will be seen, the pedal will then be securely locked against movement so that unauthorized use of the vehicle will be prevented. To free the pedal it is simply necessary to again engage the key with the outer end of the rod 21, in the manner previously indicated, for retracting the rod and raising the bolt. The key will then serve to hold the rod retracted and maintain the bolt elevated so that the pedal may be freely moved. I accordingly provide a highly effective construction for the purpose set forth and, as will now be seen, a device which may be readily employed upon one of the operating pedals of substantially any conventional design of motor vehicle.

Having thus described the invention, what is claimed as new is:

1. A device of the character described including a casing, means for securing the casing to a motor vehicle pedal, a spring pressed bolt mounted within the casing, key operated means slidably shiftable for retracting the bolt, and fixed means arranged to coact with the bolt for holding the casing against movement with the pedal.

2. A device of the character described including a casing, means for securing the casing to a motor vehicle pedal, a spring pressed bolt mounted therein, a key operated rod slidably received through the bolt and provided with an inclined shoulder to coact therewith for elevating the bolt, and fixed means mounted to coact with the bolt for securing the casing against movement with the pedal.

3. A device of the character described including a casing, means for securing the casing to a motor vehicle pedal, a spring pressed bolt mounted within the casing, a key operated rod for retracting the bolt spring pressed to normally free the bolt, and fixed means arranged to coact with the bolt for securing the casing against movement with the pedal.

4. A device of the character described including a casing, means for securing the casing to a motor vehicle pedal, a spring pressed bolt mounted therein, a rod slidably retractable for elevating the bolt, a key rotatable upon the rod to coact therewith and with the casing for retracting the rod, and fixed means arranged to coact with the bolt for securing the casing against movement with the pedal.

5. A device of the character described including a casing, means for securing the casing to a motor vehicle pedal, a spring pressed bolt mounted within the casing, a rod, slidably retractable for elevating the bolt and projecting through a wall of the casing, a guard sleeve surrounding the projecting portion of said rod, a key engageable with the projecting portion of the rod and rotatable thereon to coact at its inner end with said sleeve for retracting the rod, and fixed means arranged to coact with the bolt for securing the casing against movement with the pedal.

6. A device of the character described including a casing, means for securing the casing to a motor vehicle pedal, a spring pressed bolt mounted within the casing and having an enlargement provided with a slot therethrough, the slot being formed with a beveled upper end wall, a rod extending freely through said slot to project through a wall of the casing and having an inclined shoulder rising therefrom to coact with the end wall of said slot whereby the rod may be retracted for elevating the bolt, means rotatable upon the rod to coact with the casing for retracting the rod, and fixed means arranged to coact with the bolt for securing the casing against movement with the pedal.

7. A device of the character described including a casing, means for securing the casing to a motor vehicle pedal, a fixed quadrant extending freely within the casing, a bolt mounted within the casing and spring pressed to engage the quadrant for securing the casing against movement with the pedal, and key operated means slidably shiftable to coact with the bolt for elevating the bolt.

In testimony whereof I affix my signature.

ANTONIO J. AMUEDO. [L. S.]